(12) United States Patent
Considine et al.

(10) Patent No.: US 8,417,938 B1
(45) Date of Patent: Apr. 9, 2013

(54) ENVIRONMENT PRESERVING CLOUD MIGRATION AND MANAGEMENT

(75) Inventors: John F. Considine, Hollis, NH (US); Paul M. Curtis, Sudbury, MA (US); Sanjay G. Dixit, Southborough, MA (US); Fernando Oliveira, Sudbury, MA (US); John R. Rousseau, Burlington, MA (US); Jonathan Whitney, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 253 days.

(21) Appl. No.: 12/905,505

(22) Filed: Oct. 15, 2010

Related U.S. Application Data

(60) Provisional application No. 61/252,466, filed on Oct. 16, 2009.

(51) Int. Cl.
*H04L 29/06* (2006.01)

(52) U.S. Cl.
USPC ........................................................ 713/151

(58) Field of Classification Search ........................ None
See application file for complete search history.

(56) References Cited

U.S. PATENT DOCUMENTS

| | | | |
|---|---|---|---|
| 5,832,225 A | 11/1998 | Hacherl et al. | |
| 6,262,976 B1 * | 7/2001 | McNamara | 370/254 |
| 6,671,801 B1 | 12/2003 | Prakash | |
| 7,349,348 B1 | 3/2008 | Johnson et al. | |
| 2008/0080396 A1 | 4/2008 | Meijer et al. | |
| 2008/0080526 A1 | 4/2008 | Gounares et al. | |
| 2008/0082667 A1 | 4/2008 | Meijer et al. | |
| 2008/0082693 A1 | 4/2008 | Meijer et al. | |
| 2008/0083025 A1 | 4/2008 | Meijer et al. | |
| 2009/0088142 A1 | 4/2009 | Baribault et al. | |
| 2011/0022711 A1 * | 1/2011 | Cohn | 709/225 |

OTHER PUBLICATIONS

Gu, Yunhong, et al., "Exploring Data Parallelism and Locality in Wide Area Networks", 2008 Workshop on Many-Task Computing on Grids and Supercomputers, Univ Illinois, Chicago, IL 60607, Jan. 10, 2008.

Hayes, Brian, "Communications of the ACM archive", Cloud Computing, vol. 51, Issue 7 (Jul. 2008) table of contents, Web science, ACM New York, NY, USA, pp. 9-11, Jul. 2008.

Vaquero, Luis M., et al., "A break in the clouds: towards a cloud definition", ACM SIGCOMM Computer Communication Review archive, vol. 39, Issue 1 (Jan. 2009) table of contents, ACM New York, NY, USA, pp. 50-55, Jan. 2009.

\* cited by examiner

*Primary Examiner* — Brandon Hoffman

(57) ABSTRACT

A system and method of operation is disclosed describing migration, management, and operation of applications and servers from customer data centers to cloud computing platforms without modification to existing environments or user access procedures. A cloud isolation layer operates as a virtual layer on the cloud platform, enabling server operation in a virtual environment that appears the same as the prior local environment. A cloud software image and a local cloud gateway act to redirect existing addressing from the local environment to the cloud implementation through secure network and data paths. A local management application provides a control interface and maps and manages the local environment and utilized cloud resources.

18 Claims, 11 Drawing Sheets

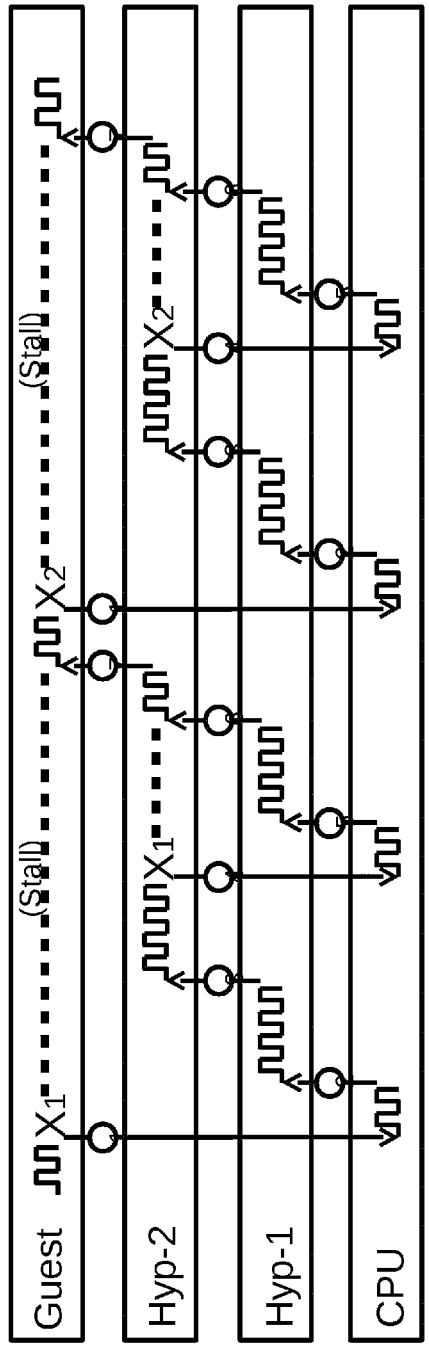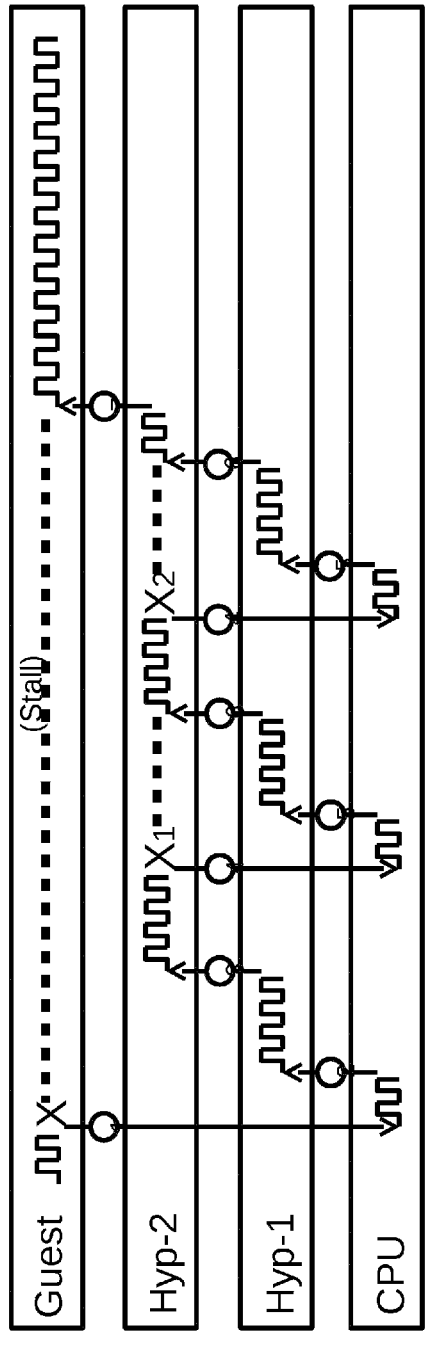

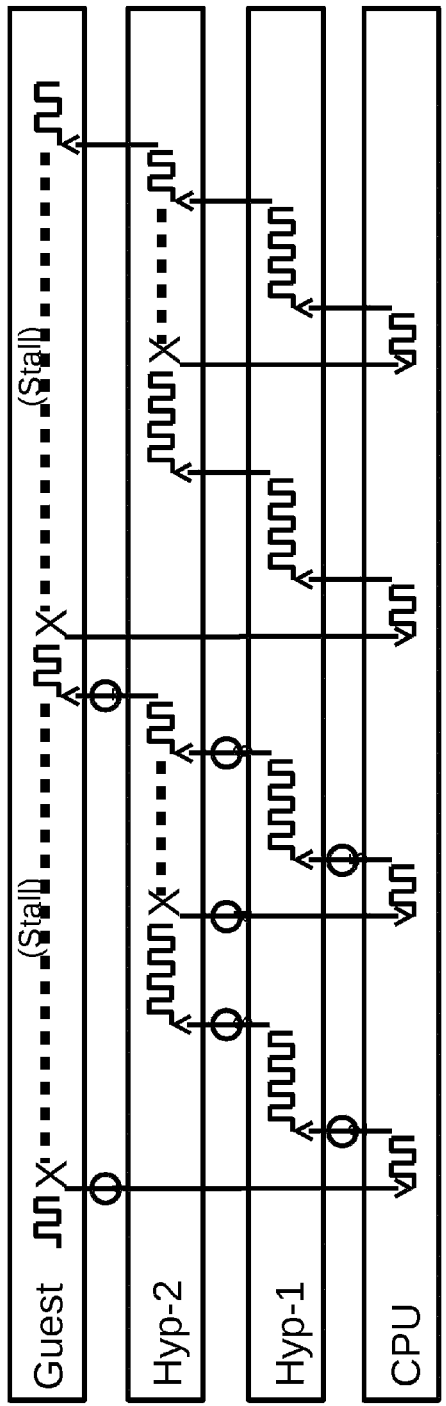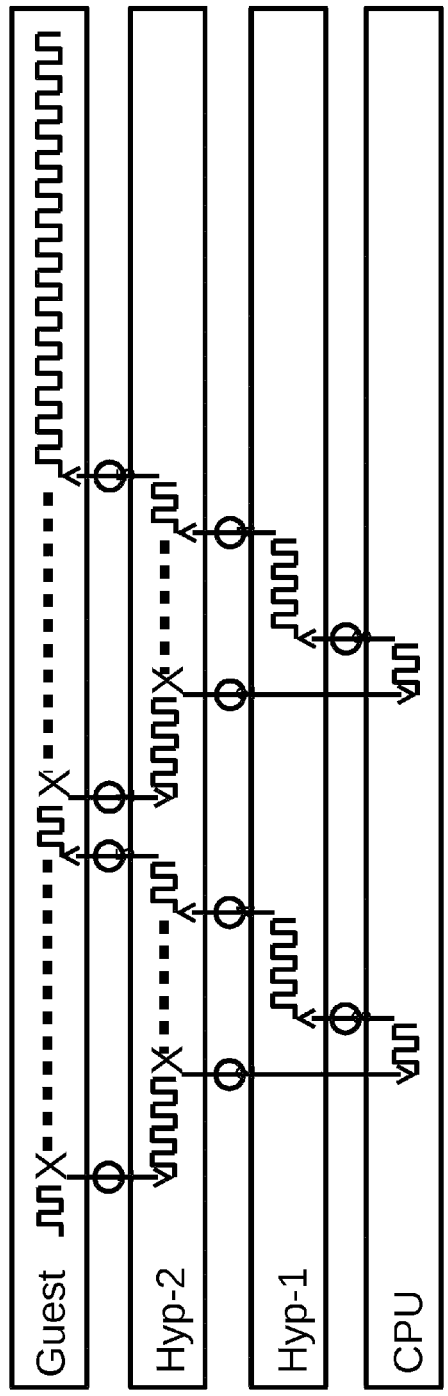

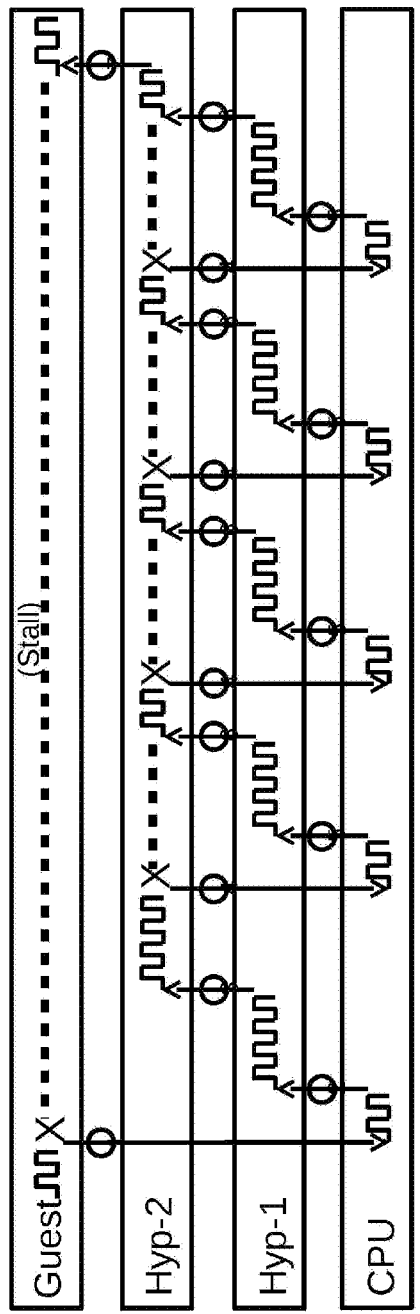
Fig. 10a Some Guest operations cause many accesses of registers in Hyp-2
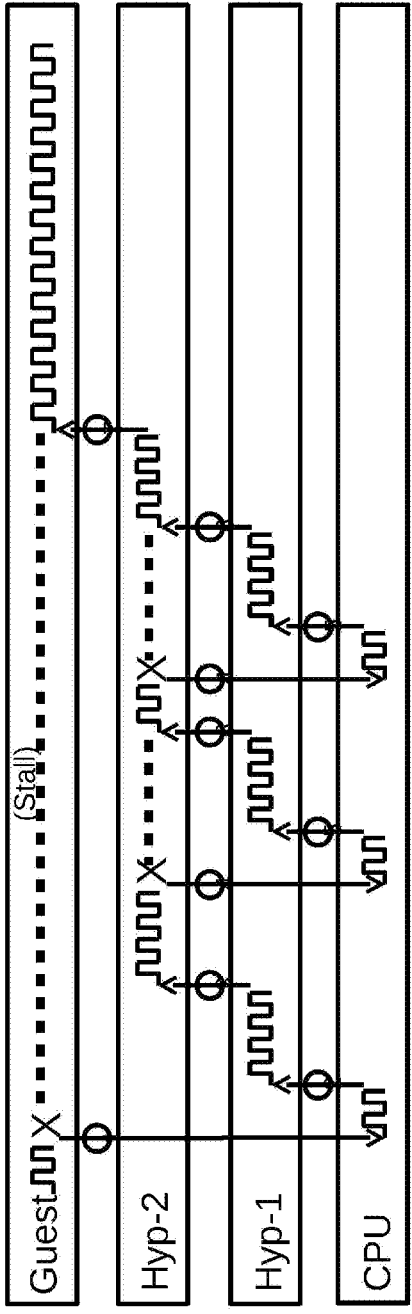
Fig. 10b Use memory instead of register access & remove redundant writes

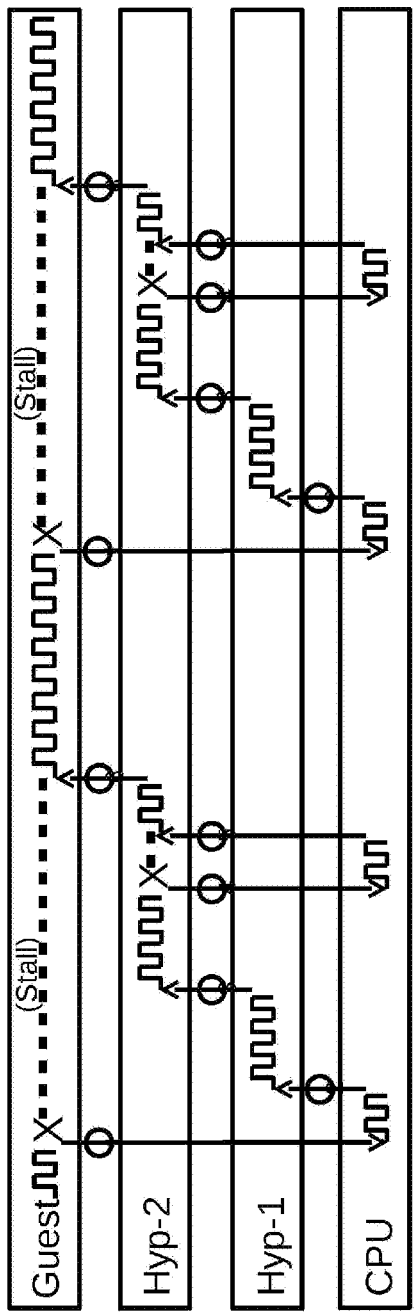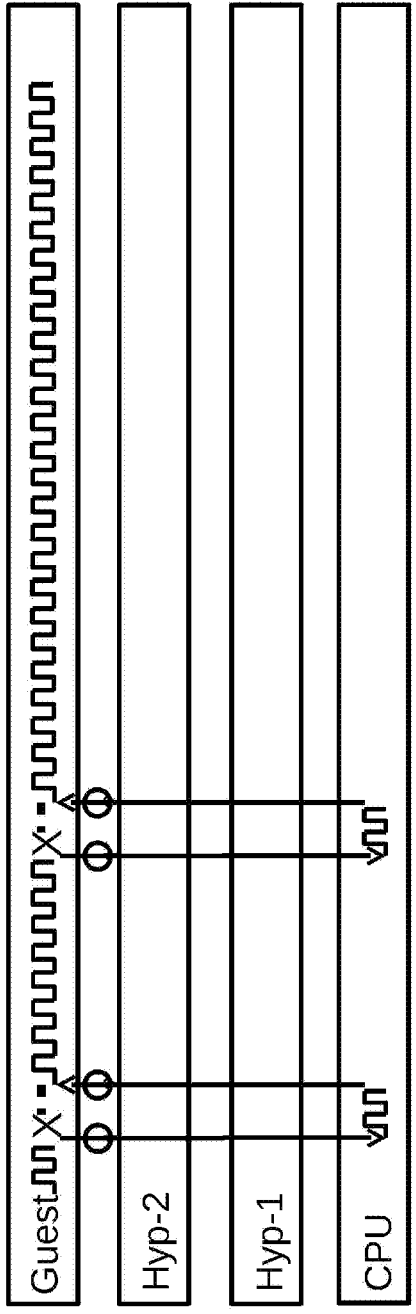

ENVIRONMENT PRESERVING CLOUD MIGRATION AND MANAGEMENT

CROSS-REFERENCE TO RELATED APPLICATIONS

This utility patent application claims priority from U.S. provisional patent application Ser. No. 61/252,466, filed Oct. 16, 2009, titled "ENVIRONMENT PRESERVING CLOUD MIGRATION AND MANAGEMENT" in the name of John F. Considine, Paul M. Curtis, Sanjay G. Dixit, Fernando Oliveira, John R. Rousseau, and Jonathan N. S. Whitney.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2010, CloudSwitch, Inc.

BACKGROUND

1. Field of the Disclosure

The invention deals with cloud computing, and more particularly with migrating, operating, and managing existing software environments from data center-based computing resources to cloud computing platforms.

2. Background

Cloud computing embraces the concept of providing computer resources as a third party service. Resources include storage, networking, and processing. Different cloud implementations offer different variations of available services. Commercial benefits include paying based on actual resources used, dynamic access to resources based on usage demands, and third party management of computing resources. Drawbacks include requirements to modify applications or operating environments to connect to a cloud provider, limitation to a specific cloud provider based on proprietary APIs, and third party control of computing resources. Third party control may introduce risks or questions about the security of data and the network.

Utilization of cloud computing resources is at various levels as provided at a platform level and as utilized by customers. There are strong economic incentives to utilize cloud resources, as local software solutions often require available hardware resources to meet maximum loads for every individual application or server. As such, local servers generally run without maximum resource usage. Moving to a cloud model allows a cloud provider to dynamically allocate resources based on current load, and charge only for specific usage. Thus a cloud customer removes both management costs and concerns of maintaining local hardware and avoids costs of provisioning hardware that may mostly be underutilized except during high load spikes. While attractive due to management and utilization efficiencies, there are costs associated with moving existing applications to cloud platforms or configuring them to work with clouds. Complexity may range from recompiling an application for a specific platform to substantial code modifications to access and utilize cloud APIs. In addition to costs associated with moving applications to a new platform, there may be additional costs or overhead involved if utilizing the cloud changes how an existing application may be accessed. Adding or altering access methods for users may entail company-wide policy changes and retraining, which may be a significant hurdle preventing cloud utilization. Further, changes may be required to secure data, devices, and communications. Applications run within closed or secure networks, or connected to identifiable and secure hardware, may operate without securing each individual communication or data transaction. Cloud access is generally over the Internet, rather than restricted to internal access, and hardware resources and connections may be fully under third party control. Thus applications may need to add or implement security solutions protecting all data, network, and other device access calls once an application is moved to a cloud. Current products have taken different paths in attempts to address these problems and reduce the barriers to cloud utilization.

3. Description of Prior Art

Some products allow for cloud creation, allowing a company to run its own cloud. This addresses security and trust control, but does not maximize available cloud resources or the benefits of third party management, nor ease migration of existing applications in the cloud. Similarly, some products are designed to allow a customer to build a grid/cloud with a set of unique capabilities. These technologies are designed to allow seamless scaling of an application across a large pool of resources. To allow such scaling, the internal cloud must be scaled to handle peak resource utilization, and thus is less than fully utilized outside of the peak periods. Often the maximum resources must be allocated to equal the sum of the peak utilization of everything operating within the cloud, which leads to the management and cost burden of maintaining a full set of resources which may be lightly loaded for most of the time.

Other products help create new applications for the cloud and ease cloud adoption. At a first level, they access cloud application programming interface's (API's) to enable provisioning servers and using clouds. Users then define or build new applications utilizing templates to deploy applications to one or more clouds. In general, these products focus on building or delivering an application to a cloud—they create a standalone server or collection of servers in the cloud. The focus is to allow simplified horizontal scaling, or to create new application or services in or for the cloud rather than moving existing applications.

Additional products focus on tools and packaging to manage applications for the cloud. This is best described by building packages, environments, and components into a server that can be deployed to a specific cloud. The application can then be recompiled for a different cloud. These products provide tools and environments for packaging and deploying application to the cloud. The technology works by adding (or subtracting) components from the existing operating environments such that they can run in the cloud. They generally focus on altering existing applications to enable a move to a cloud. These solutions generally tie an application to a specific or individual cloud. Packaging solutions rebuild application images for each cloud, but do not account for data movement or modifications made directly to the application once deployed to the cloud, and therefore lock applications to the specific cloud.

Some products focus on providing more detailed monitoring of cloud resources. Generally, these are third party monitoring services. They enhance cloud monitoring capabilities, but are narrowly focused on that single aspect.

Similarly, some products provide control consoles (or portals) for the clouds. Their focus is to provide a simplified graphical interface for controlling and monitoring resources in the cloud. These are generally third party services, customized for cloud operation, and are narrowly focused to the control interface.

Some solutions provide cloud services (actual compute and storage resources) and products that enable customers to take advantage of these resources. These products are restricted to operate against resources that are managed by their specific software. These products require the cloud provider to install their components as part of the cloud or the whole cloud.

Some solutions focus on providing the capability to bridge the network between the cloud and the data center. Current solutions include inserting VPN software into the end users operating environment, or providing the ability to remotely connect to cloud deployments without completely integrating with existing data centers.

Some solutions enable virtual machines to be converted between underlying cloud formats (i.e. between hypervisor formats, and cloud specific functions). Some of these operate by recompiling an application for different clouds. Others convert the virtual machine image format so that they can be deployed into different cloud environments. The current solutions alter the users operating environment in order to allow them to execute in the different cloud environments.

United States Patent Application 2008/0080526 "Migrating Data to New Cloud" (Alexander G. Gounares et al., Apr. 3, 2008) discloses, in the Abstract, "a system and/or a method that facilitates preserving and maintaining data and/or services associated with a network service. The network service can be any collection of resources that are maintained by a party (e.g., third-party, off-site, etc.) and accessible by an identified user over a network (e.g., WAN, Internet, etc.). An interface component can receive a termination notification related to the network service. An executor component can relocate at least a portion of one of data and a service associated with the terminated network service to a disparate replacement network service in order to preserve any services and/or data related therewith."

United States Patent Application 2008/0082667 "Remote Provisioning of Information Technology" (Henricus Johannes Maria Meijer et al., Dec. 20, 2006) discloses, in the Abstract, "Hardware, software, service and/or expertise can be moved from on-premise to a remote location (e.g., central, distributed . . . ). Accordingly, at least a large degree computation can be moved to the center to exploit economies of scale, among other things. In such an architecture, computational resources (e.g., data storage, computation power, cache . . . ) can be pooled, and entities can subscribe to a particular level of resources related to a private entity IT network."

The existence of these varying solutions, and of varying cloud platform standards and options, adds an additional burden of cross-cloud compatibility. While a cloud-specific implementation may meet a customer's need, it may prove insufficient should it become beneficial to move the implementation to a different cloud platform. Such a move could be triggered by new cloud availability, new cloud offerings or supported technology, performance enhancements or degradations of existing clouds, new pricing for cloud resources, or failure or cessation of services of an existing cloud provider.

What is needed is a solution which provides network and data security without requiring third party trust, enables migration and operation of existing applications to and from a data center to any cloud without altering the application or user environment, monitoring of cloud performance integrated into the existing user environment, and utilization of multiple available clouds and cloud resources to maximize performance.

BRIEF SUMMARY

The solution is to provide a complete software system for migration, management and operation of existing customer applications and servers seamlessly in a cloud computing environment. The solution includes multiple components to enable customers to preserve existing application and server environments or build new environments, dynamically move those environments onto different cloud resources, and provide secure communications and data to and from, and within, a cloud, while avoiding changes to existing applications or user environments. The solution creates a flexible implementation where servers may be moved from one cloud to another, or to and from the data center and the cloud. This provides a level of security by allowing customers to bring the applications back home to a data center or to a preferred cloud vendor in situations where there are problems with one or more cloud providers. This solution also allows for development of applications in public clouds, and then migration to more secure clouds or back into a data center, without modification to the environment, should security and control become more important, such as when developing applications begin using real data sets, switch from development to production use, or encounter other heightened security needs. The solution also includes the ability to migrate based on geographic considerations such as "nearness" to end users and specific state or country locations in order to satisfy performance or legal concerns.

One component may be a local management application (LMA). The LMA may scan and map existing network and device topology. The LMA may manage server and data policies to move existing local applications and servers to available cloud resources for best performance.

Existing data center or other computing solutions may operate on standard or customized platforms, but are very likely to differ in implementation details between other computing solutions. Servers may be implemented for different purposes between companies, or even within the same company. Some applications or servers may be isolated from others for security, performance, or other reasons. Other servers may access shared devices, such as storage, or share computing resources such as memory and processing between multiple applications. Cloud computing offers benefits to improve utilization of computing resources. Rather than operating specific servers with specific resources dedicated to the applications and operations of each specific server, a cloud may provide all the computing resources, on demand, that are required. Thus storage, memory, and processing may be merged into a single cloud rather than separated across multiple dedicated computers. However, moving existing applications and computing environments onto cloud solutions presents difficulties. Even operating on standard platforms, great variation may exist. Hardware devices, including processing, storage, and networking devices, will likely vary in all implementations. Addressing schemes, including device names and network addresses, also likely vary in all implementations. The LMA may act as the manager to observe these implementation-specific differences and map them onto available cloud resources. The LMA may also provide an interface to manage such resources, including tools for migration to and from the data center and available clouds. By tracking information about available clouds, the LMA may also dynamically match and migrate servers to specific clouds to maximize performance, minimize costs, or meet other configured goals.

Working in conjunction with the LMA, another component may be a local cloud gateway (LCG). The LCG may act as a gateway to a cloud from the local network. The LCG may map existing network or device addressing from the local environment to the cloud environment, allowing applications in the cloud to appear to end-users and applications the same as if they were operated locally. The LCG may also enable an encrypted data path without modification to existing applications or servers. The LCG may be operated in multiples to allow multiple local network connections and support high availability through redundant paths, scale performance, and support multiple private networks. The LCG may also provides access and mapping of local resources such as storage devices, console redirectors, and management networks such that the servers operating in the cloud can access, and be accessed by, the local resources.

Another component may be a cloud software controller (CSC). The CSC may run for the customer in the cloud. The CSC may communicate with cloud-specific APIs, preserve addressing/naming by remapping cloud resources to pre-existing addressing schemes, and monitor cloud resource usage and performance. The CSC may interact with the resources local to the cloud in order to monitor activity, allocate resources, and manage cloud-local events. The CSC may work in conjunction with the LMA to enact global policies and provide complete control of the cloud resources. The CSC may also redirect servers and applications operating in the cloud to available cloud resources based on usage or other demands.

Another component may be a cloud isolation layer (CSL). The CSL may run between the cloud virtualization layer and the customer's application. The CSL may operate a virtual layer on top of cloud-specific hardware or cloud-specific virtualization. The CSL may map cloud resources to pre-existing device names, enabling server-specific applications to operate without change after moving to a cloud. The CSL may handle encryption within the cloud, enabling encrypted cloud storage and an encrypted data path (including, for example, network, i/o devices, console, and other devices and paths) to the local software appliance without modification to existing applications. The CSL may remap code accessing privileged instructions and it may manage memory resources in order to allow the customers application to access the cloud virtualization layer, thus avoiding performance loss due to layered virtualization. The CSC may also act as a "proxy" server for communication and control of the CSL. This is used for cloud environments that provide a limited number of externally accessible IP addresses. In this case, the LCG may be given a public address, and then relay control and communication to the CSL nodes that only have private addresses. This action will conserve the public access, but still allow the LMA to manage the resources.

FEATURES AND ADVANTAGES

The benefits of this invention include fully integrated cloud control, including data center insertion, cloud deployment, and cloud usage metering and monitoring. Provable, end-to-end security may be enabled without involving third party or cloud-specific solutions. Security management and hardware management solutions may be integrated independent of cloud-specific offerings. Applications may be matched to best-fit clouds to allow distribution across multiple cloud solutions to meet varying configurable requirements, including price, performance, service level agreements, security, and other goals. Application deployment within a cloud may be controlled to manage available cloud-specific resources. Available cloud resources may be monitored and reallocated dynamically to maximize performance during operation without relying on cloud provider control of such allocation. Applications and data may be dynamically deployed and migrated to and from local resources and multiple cloud platforms. And all of these benefits may be provided while preserving the naming and addressing environment, allowing operation without modification to existing applications or methods of access and utilization.

BRIEF DESCRIPTION OF THE DRAWINGS

FIGS. 8a and 8b show a problem and solution to delays of privileged instructions in multi-hypervisor situations.

FIGS. 9a and 9b show a problem and additional solution to delays of privileged instructions in multi-hypervisor situations.

FIGS. 10a and 10b show a problem and solution to delays of register access in multi-hypervisor situations.

FIGS. 11a and 11b show a problem and solution to delays of page table access in multi-hypervisor situations.

DETAILED DESCRIPTION, INCLUDING THE PREFERRED EMBODIMENT

Terminology

Figure 1:
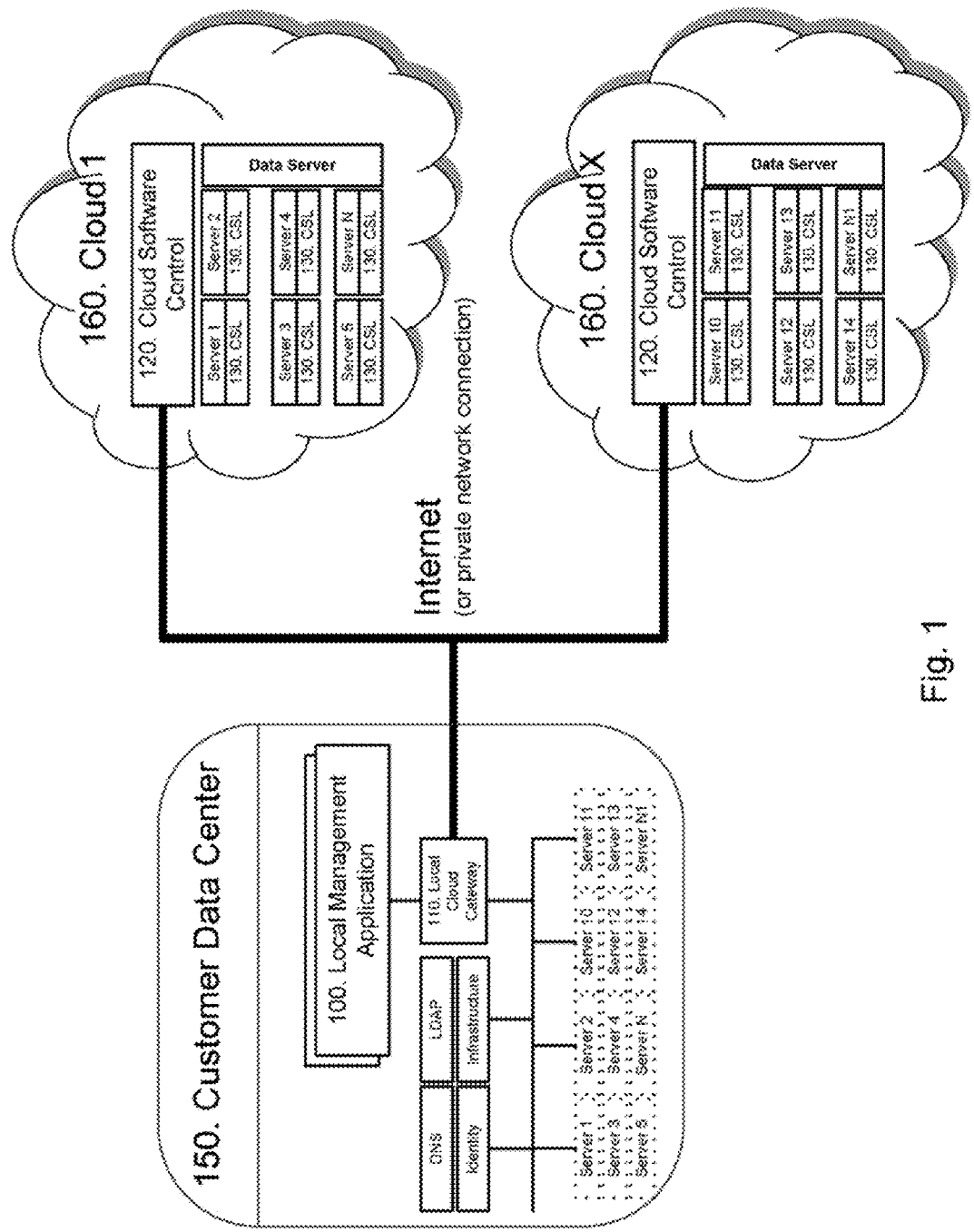
FIG. 1 is a system overview showing servers migrated from a data center to clouds.

The terminology and definitions of the prior art are not necessarily consistent with the terminology and definitions of the current invention. Where there is a conflict, the following definitions apply.

Data center: "Data Center" connotes a single room with rows or racks of dedicated computer servers. As used throughout this disclosure, "data center" includes this standard connotation and all variations of computer hardware location solutions and local networked resources. Networked resources may include desktops, servers, storage devices, printers, and other computing devices. For example, instead of storing all software applications on servers in a single room data center, a company may store various software applications across multiple desktop computers stored in multiple separate offices. This distributed hardware implementation would also be considered a "data center" for the purposes of this disclosure. As such, any hardware implementation which may benefit by moving applications, servers, or networked resources onto a cloud computing platform without modification to the existing use environment is considered a "data center" within the scope of this disclosure.

Server: For the purposes of this disclosure, "server" means any definable unit which may be advantageous to move to a cloud computing platform. Such units may include, but are not limited to, the resources utilized by a physical hardware computer, a virtual replication of such a hardware unit, or individual software packages or installations. This includes all associated components such as, but not limited to, compute resources (such as processing power, specific CPU and capabilities), attached storage (such as boot disks, data disks, local and networked storage), networking devices local to the server (such as network interface card(s) and associated configurations), and I/O devices (such as VGA, USB, and keyboard devices). Thus "server" encompasses the resources and everything the software operating on the resources require to function properly, along with the tools used to monitor and manage the server and expected to be present.

Source Server: For the purposes of this disclosure, "source server" means a server and its environment prior to migration to a cloud environment. In the case of migration between clouds, the source server represents the current location or the location prior to the action of migration.

Cloud: For the purposes of this disclosure, the "cloud" refers to the single or cumulative offerings of commercial Cloud Computing providers such as, but not limited to, Amazon, Microsoft, and Savvis, or custom or future Cloud Computing solutions that provide hosted compute and storage resources or other computing or related services. "Cloud" can also refer to a set of resources within a company that have been configured to deliver flexible, on-demand compute and storage resources defined as an "internal cloud".

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

This disclosure describes systems and processes to manage and migrate existing computing solutions onto cloud computing platforms without specific modifications to users' computer environments, configurations of systems moved to a cloud, or the environments of other programs or systems which access those moved to a cloud. While the focus and discussions herein are of managing and migrating existing servers, the described systems and processes may work with, and are intended to also work with, newly developed applications and computer technology thus allowing developers and IT personnel to utilize existing tools, methodologies, and processes to develop applications that operate in the cloud computing environment.

The solution is to migrate servers from a data center to the cloud without requiring changes to server configurations, individual applications, users' environments required to access the servers, or environments of other servers which also access the migrated servers. In addition to seamless migration without modification, the solution allows for secure network communications and storage, and continuation of existing technological solutions such as remote server monitoring and control without further modification. A system implementing such a solution may do so utilizing various components, including, in a preferred embodiment, a local management application (LMA), one or more local cloud gateways (LCG), one or more cloud software controllers (CSC), and a cloud isolation layer (CSL) for each migrated server. Several of these components may be used as common resources across multiple migrated servers. In the preferred embodiment, there is one local management application for an entire department or business. Similarly, the LCG and CSC's can be shared within the scope of a single network with one pair of LCG and CSC supporting many migrated servers. The CSL can operate in a 1:1 ratio with migrated servers, or can be used to host several migrated servers in the cloud. Further, the functions carried out by each of these components may be implemented in a single compute instance (server or virtual machine) on either the data center side, or on the cloud side.

Local Management Application

Referring to FIG. 1, LMA 100 performs multiple functions, including providing a management interface for the overall network and cloud implementation. The LMA, which is a software or dedicated hardware application operated within data center 150, may be integrated with other local applications, or operated separately. Management may be controlled through displayed interfaces or an available application programming interface (API). In order to manage available resources, the LMA may understand local network topology, server configurations, current cloud utilization, and available cloud resources. This allows establishing server and data policies, and migration of servers to and from various cloud providers and local computer resources. The LMA allows applications and tools anywhere within the data center or on utilized clouds to operate 708 as if everything was within the data center. This may include existing services and tools such as, but not limited to, self service, role based authentication and control (RBAC), and integration in management tools such as, but not limited to, run-book automation, provisioning systems, or ticketing systems.

Figure 7:
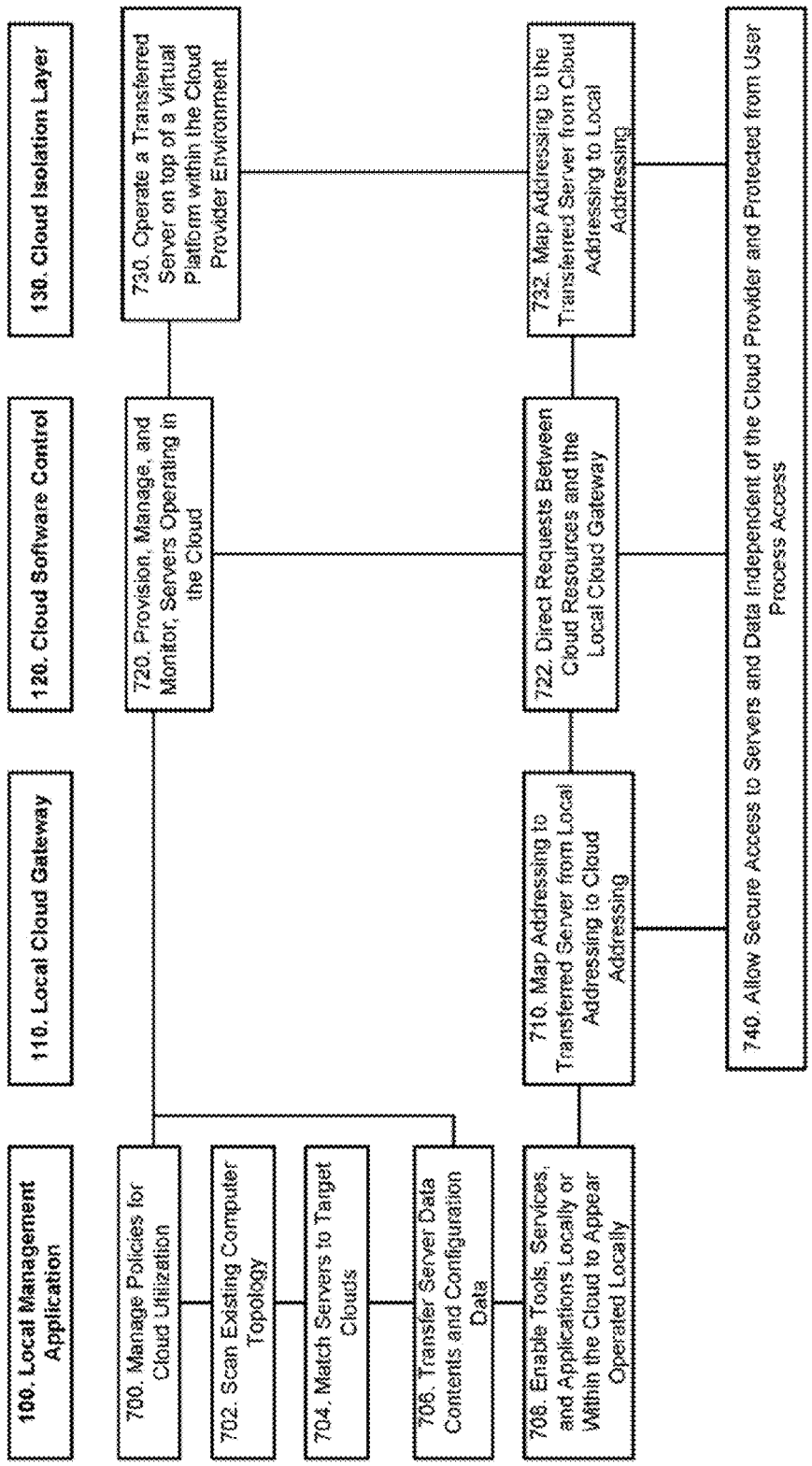
FIG. 7 is a flowchart overview of the operations and interactions of the components.

Referring also to FIG. 7, LMA 100 may automatically, or as triggered through a management interface, scan 702 an existing computer topology. This topology may include existing naming, numbering, and segmentation of computer networks as well as existing hardware resources connected to specific servers. Because naming and identification schemes most likely will vary when servers are moved into the cloud, establishing such a topology before migration allows remapping of addresses to servers and devices to allow access without modification to existing servers or access procedures.

Scanning may involve inspection of running environments in order to determine the specific devices utilized by the server as well as their configuration. The scanning may also occur with the server off-line or powered down. In this case, the meta-data provided from a virtual machine format (such as VMX from VMware, or the standard Open Virtualization Format (OVF)) may be used to collect basic configuration information. In other cases, the specifics of the server environment may be collected from the configuration files stored in the servers operating system. In one embodiment, this information is collected from examining the file systems or disk drives of the Source Server. Capturing this information allows transfer of information to recreate the specific devices and their respective configurations within a cloud, and by preserving the exact device names, locations, configuration, and settings, the operating system, management tools, and applications may operate in the cloud without modification. Scanning may also involve capturing information about associated devices such as, but not limited to, networking equipment and storage devices. This information may include data on storage configurations (such as, but not limited to, volume RAID, snapshots, thin provisioning, zoning, topologies, and sharing), and network configuration (such as, but not limited to, VLANs, QOS, firewalls, and load balancers).

In addition, the computer topology information may be entered into the system from other sources including, but not limited to, manual data entry and descriptions, extraction from other specific topology tools, or connection to and extraction from a global data center management tool or framework such as ITL configuration management database (CMDB).

Figure 2:
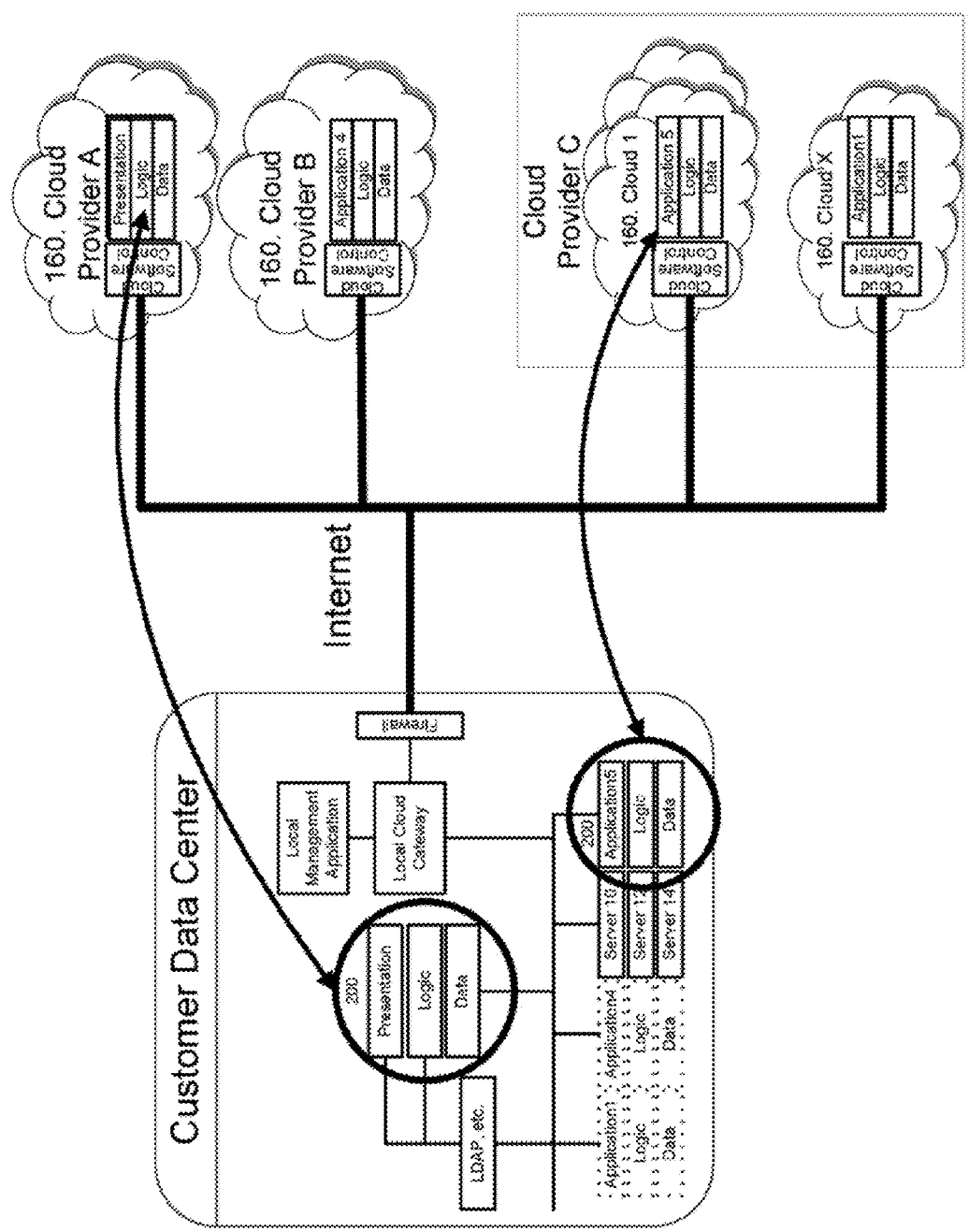
FIG. 2 is a system overview showing dynamic migration and cloud distribution capabilities.

In addition to knowledge of existing local resources, the LMA may also store information about specific cloud provider resources. Such information may be manually entered as information about cloud offerings becomes available, dynamically accessed through access to cloud specific APIs, or dynamically determined based on tracking specific cloud performance. Referring also to FIG. 2, different clouds 160 may offer different solutions, including available computing, storage, and network resources, and different utilization costs for each. As both computing needs and cloud computing availabilities may change, knowledge about available options allows the LMA to provide management 700 options to migrate servers between different cloud platforms, to-and-from local computing resources, and configure management parameters to automatically perform such migration. For example, at certain resource usage levels Cloud B may become more economical than Cloud A, triggering a migration from A to B when the usage surpasses such a level. Similarly, usage may decrease below a point such that all cloud platforms are less economical than operation on local systems, at which point migration back to local servers may automatically trigger. Additionally, different clouds may provide different service levels at different pricing. Different applications 200 within a data center may have different specific requirements for performance, scale, resources, and security. While it is possible that a single cloud provider may provide the most economical solution meeting all the performance requirements of varying applications, it is likely that the best fit for varying applications spreads across multiple cloud offerings. By recording and managing cloud specific information, a given application or server may be matched 704 to the best available cloud resources through a process known as "fitting." This allows less critical applications to take advantage of the lowest price cloud offerings while allowing higher class applications to receive the service levels they require interconnected seamlessly without modification. Knowledge of available cloud platform resources, and preservation of the original topology, allows such dynamic server migration. In addition to migration, knowledge of cloud information and available services allows turning off or activating cloud resources or services based on utilization or business requirement changes. As many cloud services incur expense based on use or availability, the management application access of or forwarding commands to access cloud api's to disable/enable cloud services based on utilization needs may assist in minimizing cloud expenses.

In one embodiment, moving a source server is triggered by a user selecting a server, or a collection of one or more servers that represent an application, and executing a move command. The command may be triggered directly in the LMA, or through other management tools, such as provisioning servers, run books automation, and infrastructure management tools, which are observed and acted on by the LMA. The move process involves transferring 706 data collected from the source server into the cloud environment. This data may include the configuration data (including, but not limited to, device information and network addresses), as well as the contents of the server to be moved, including the operating system, the applications, and the data sets required by the server or application. A server move may also be triggered by local conditions within the data center. In this case, a server may have been identified as a candidate for cloud deployment, and a specified event or events trigger a movement into a cloud. Example triggering events may include resources, such as compute, storage, or networking, reaching loading limits; the targeted application requiring more resources; failure of the infrastructure; changes in the cost of power; or any other condition that creates pressure or changes on the local data center environment. The movement of servers to the cloud may be controlled by the LMA. This same control may move servers/applications from the cloud back into the data center, and from one cloud to another cloud. The move process is the same, only the direction or endpoints change depending on the conditions/commands being executed. The system may also be configured to respond to cloud-local conditions to trigger moves, such as failure of a cloud provider triggering a move either back to the data center or to another cloud, or other detectable events.

Local Cloud Gateway

LCG 110 may act as a local proxy into the cloud. The LCG may map 710 existing network or device addressing from the local network to the cloud applications, allowing applications in the cloud to appear to end-users the same as if they operated locally.

To allow operation of existing applications and servers without modification, addressing mapped to those applications and servers may be mapped from the local environment to a cloud environment. The LCG may be configured to respond to multiple addresses previously associated with servers or applications within the local network. The LCG may forward communications to the cloud to be handled appropriately, and return responses from the cloud resources to the local resources. In such a fashion, applications and servers moved to a cloud environment may appear to local programs and users as if they have not been moved to the cloud.

In addition to user access and data, the LCG may respond to hardware management monitoring and control schemes implemented by the migrated server. Such schemes may include integrated lights out management (ILOM), intelligent platform management interface (IPMI), and simple network platform management protocol daemon (SNMPD), among other solutions. Such server management may be passed to cloud resources to effectuate appropriate control of migrated servers. Providing these interfaces gives end users access to and control over cloud platforms through existing tools and interfaces. In a preferred embodiment, the SNMPD/ILOM/IPMI interfaces are tied into the Cloud Isolation Layer (CSL). This allows users to interact with a server in the cloud even when the primary interface (network) has been disrupted. By providing access at a level below the end user's operating system, recovery from improper networking errors may be possible. In addition, these interfaces provide for trouble shooting problems with a cloud server by isolating the platform from the operating system running on it.

In addition to management and proxy services, the LCG may enable secure communications 740 from the data center to the cloud. Existing applications may have existing encryption, or may have relied on operation within a secure data center. Migration to the cloud moves security control from the data center to the cloud provider. By using the LCG as a secure encryption point, security may be retained from the data center level without requiring modification to existing servers, applications, or exposed environments.

LCG's may be deployed and configured in different arrangements. A single LCG may be configured as a proxy for all migrated servers and interact with multiple clouds. Alternatively, multiple LCGs may be deployed for redundancy or performance purposes. LCG distribution may be based on physical locations, utilization loads, or logical divisions within existing data center or cloud resources. In general a LCG is "bridging" a specific network, sub-net, or VLAN, within a data center, thus, a preferred embodiment includes at least one LCG per sub-net. It is feasible to have one LCG bridge more than one network, but this may require multiple network connections to the platform hosting the LCG, effectively one network card per network bridged. This bridging is separate from the notion of proxying. One LCG may be used as a proxy to reach a specific cloud by several other LCG's, but the system still requires a LCG insertion point per network extended to the cloud. For network segments (or VLANs) that exist entirely in the cloud, no corresponding LCG is required.

Cloud Software Control

CSC 120 may run for the customer in cloud 160. The CSC may communicate with cloud-specific APIs; manage server life cycle in the cloud including starting, stopping, resetting, cloning, deleting, or taking snapshots of a server, or moving the server back to the data center or to another cloud; route 722 network traffic between the data center and one or more servers moved to the cloud; monitor cloud resource usage and performance; or perform other cloud-side functionality. As the operating software, the CSC may manage and monitor 720 servers in the cloud and redirect available cloud resources to servers/applications moved into the cloud based on usage demands. Each utilized cloud may have at least one operating CSC.

Although the CSC may run for a customer within a cloud, and act as the cloud-side bridge, switch, or router for communicating with LCGs, the CSC need not be visible to the customer. Instead, the CSC may act as an invisible control point, communicating with the cloud API and remapping communication requests between LCGs and migrated servers. Because the LCG operates within a cloud, the LCG may be cloud-specific to maximize performance and utilize cloud-specific implementation and API differences. The CSC may perform varying functions within a cloud. The CSC may take action based on cloud server failure to restart customer servers that have faulted. The performance monitoring components may also be used to facilitate "auto-scaling" of cloud applications by allocating additional servers in the face of increased load. CSC's may also be run in multiples to scale performance and to provide redundancy. The CSC may also play a key role in moving a server to the cloud by acting as a local resource to facilitate data transfer between endpoints defined by the data center, the cloud operating the specific CSC, or another cloud. The CSC may also operate as a relay or proxy for managing CSL's or other components in the cloud. This configuration may be used to reduce the number of "public" or internet facing resources that are required for managing resources in the cloud. The CSC may be accessed from the LMA and the management commands may be forwarded to the other components in the cloud using internal networking.

Cloud Isolation Layer

Figure 4:
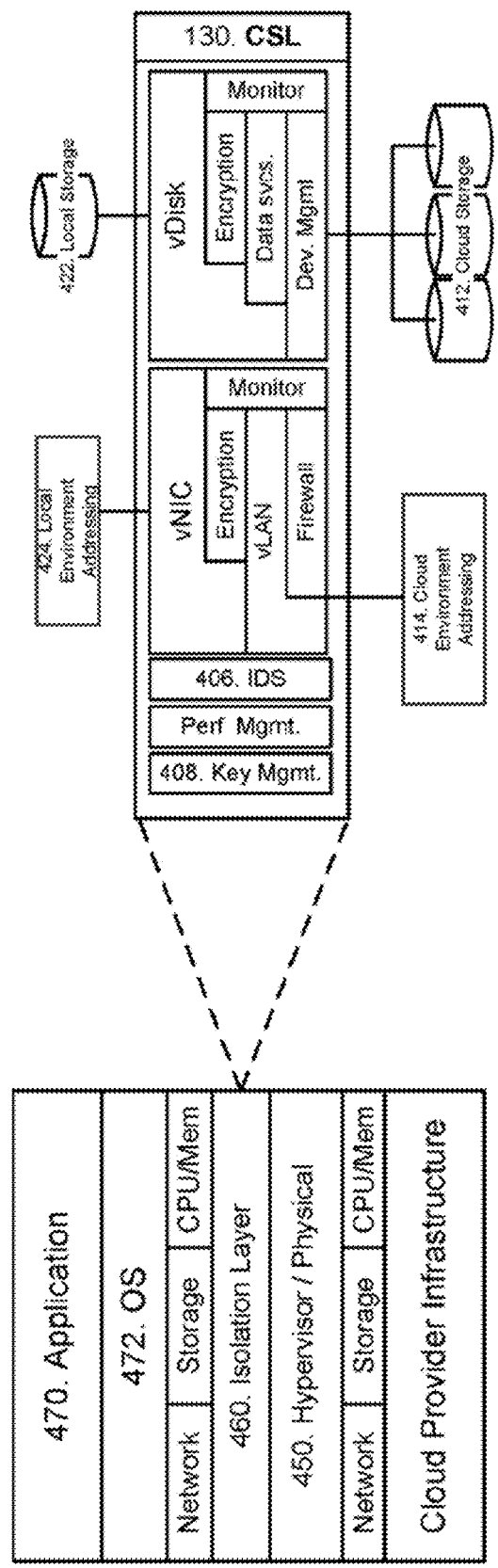
FIG. 4 is an illustration of the invention adding an isolation layer to utilization of cloud platforms, and a detailed expansion of the isolation layer.

Cloud platforms implement services in varying fashions. Data storage may be available without identification of where or how data is stored in within the cloud, but only that data is made available through cloud APIs. Applications may be operated within cloud platforms, generally through virtual servers operating on top of hypervisors hiding the underlying hardware and allowing operation of multiple virtual machines on the same physical hardware. Referring also to FIG. 4, CSL 130 may operate as virtual layer 400 on top of hypervisor 450, or directly on top of actual hardware should a cloud provider allow that option. On top of the CSL, application layer 470 may operate 730 operating system 472 and applications of the migrated server. Like a hypervisor, the CSL may present virtual hardware to the migrated server to operate. When operated on a hypervisor, this adds a second level of virtualization which may impact performance, but adds control at the virtual hardware level to capture and redirect network and other hardware access calls and insert monitoring, security, and other management controls.

Environment

The CSL may act to remap 732 and preserve device and network topology for migrated servers. The CSL may receive mappings from the LMA as part of a cloud fitting process. The information captured from the source servers may be processed using a cloud provider database to select an appropriate cloud, the correct resources within a cloud, and then a mapping between cloud resources and application requirements may be created and delivered to the CSL. Multiple components may be involved in this mapping. The LMA may capture and analyze source server configuration. The fitting process, run in the LMA, may create the allocation schemes and select the appropriate cloud. The CSC, on commands from the LMA, may allocate infrastructure for the cloud server. The CSL may take the raw infrastructure resources and transform them into a mapping matching what the original server expected to see. Thus, devices accessed through cloud APIs, such as cloud storage 412 and cloud-networked resources 414, may be remapped and made available to the server through the same access and naming schemes as when accessed in the data center, such as local storage 422 and local-networked resources 424. For example, storage devices may be remapped through the CSL to match prior configuration, such as remapping access to C:, D:, sda, sdb, etc. to available cloud storage API calls. One or more storage devices may be mounted, aggregated or divided, and mapped to the application layer as the same device visible to the source server prior to migration.

Similarly, networking devices and other hardware may be presented by the CSL to the migrated server as if physically present to allow unaltered operation of the migrated server. Network interfaces and configurations may be created and mapped to mirror the source server. Network addressing may be remapped by the CSL to allow the migrated server to address other servers and resources in the same manner as accessed within the data center. Servers may be configured to respond to and communicate with the IP addressing scheme of the prior local environment, and configured with virtual hardware matching media access controller (MAC) or other hardware addresses which may be hard-coded or otherwise relied upon by software applications. Advanced network options, including broadcasting and advanced firewall configuration, may be configured to augment available cloud technology. Firewall configuration may include inbound/outbound filtering or other options to protect the migrated server and operate independent of both general user and cloud provider control.

Security

Figure 3:
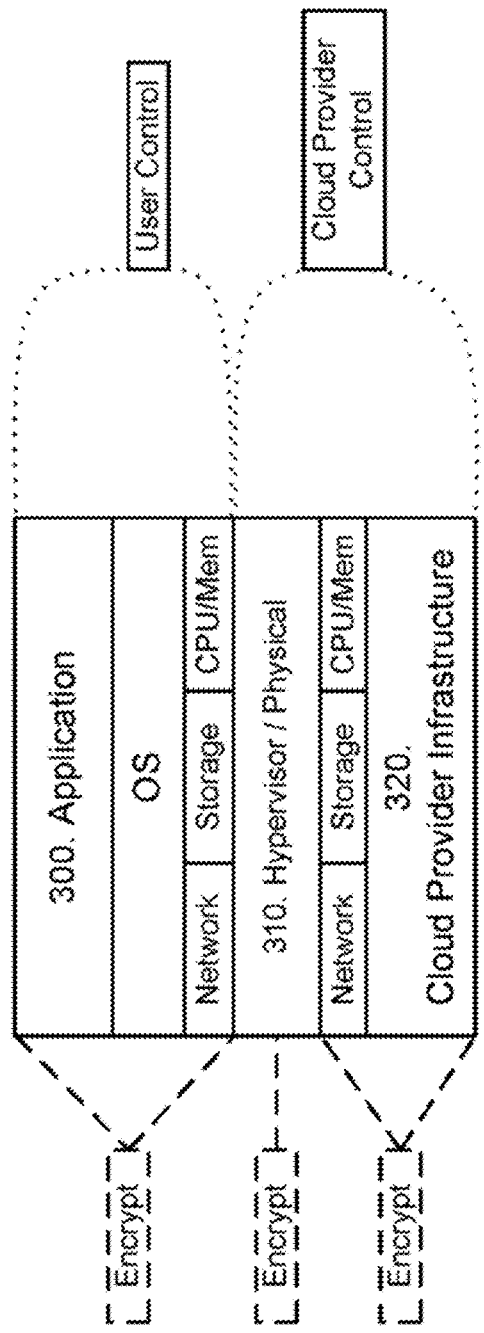
FIG. 3 is an illustration of prior art utilization of cloud platforms, including various options for encrypting data.
Figure 5:
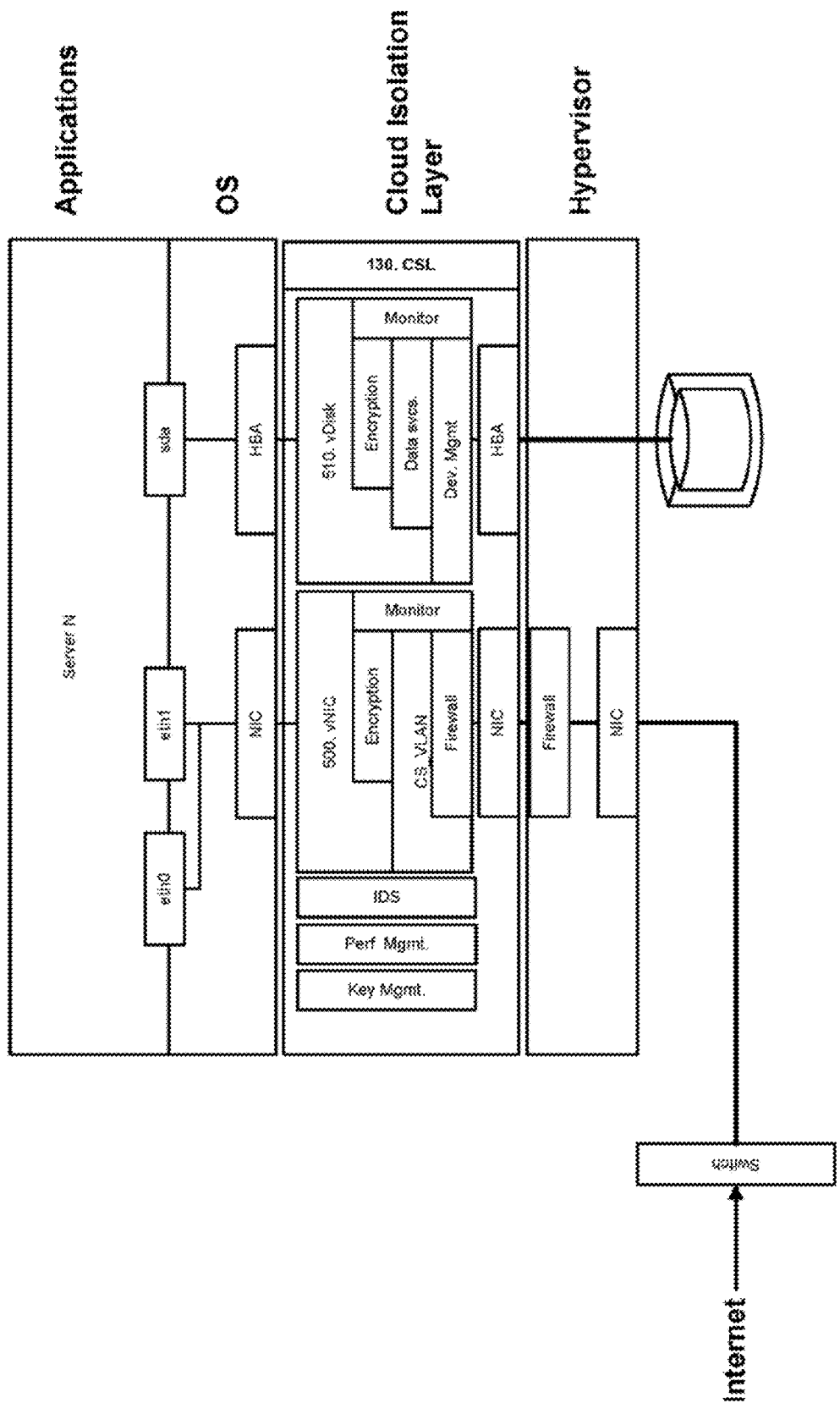
FIG. 5 is an illustration of the secure path enable by the isolation layer and independence from both the cloud provider and the operating system and applications.
Figure 6:
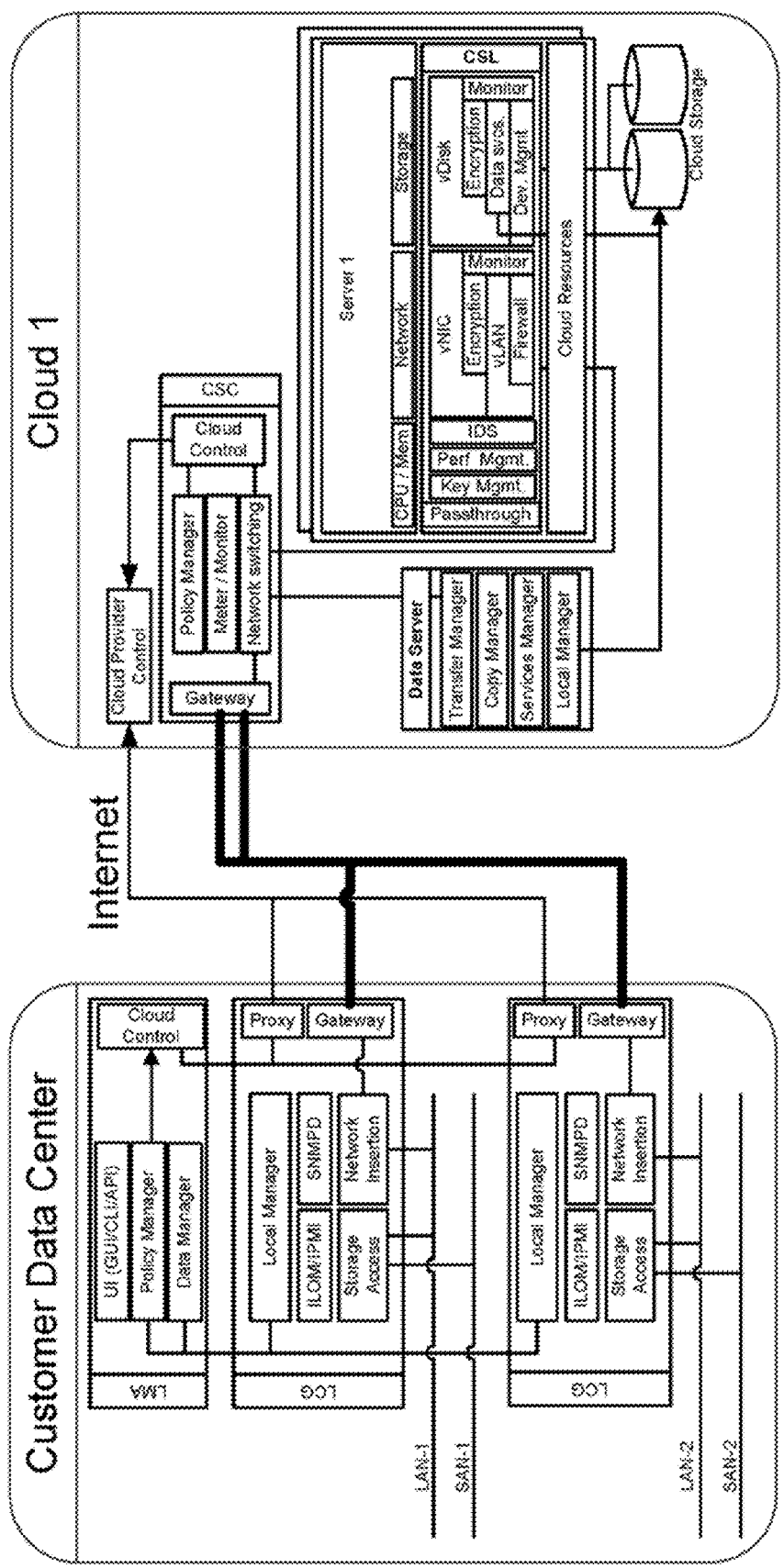
FIG. 6 is an overview diagram of all components interacting within the data center and the cloud environment.

Referring also to FIG. 3, known cloud security encryption may be done at the application level 300, hypervisor level 310, or hardware infrastructure level 320. Encrypting at the hypervisor or underlying hardware level requires trusting security encryption to the cloud provider. Encrypting at the application level moves security out of reliance on the cloud provider but requires encryption to be built into every application and exposes security risks of access by any user operation or application. By operating as a level between the cloud platform and the migrated servers, the CSL provides a layer for security which is out of cloud provider control yet neither requires application modification nor exposes security risks at the user level. Thus, the CSL may provide security to data and communications with a migrated server. Referring also to FIG. 5, CSL 130 may automatically encrypt network traffic leaving the server at the virtual network device 510 level, and decrypt inbound network traffic at the same level. This allows 740 a secure network from the LCG to the CSL without modification to existing servers, entrusting security to the cloud provider or other third party, or implementing alternative solutions such as VPN access which require individual actions, such as establishing the secure connection, which may introduce mistakes allowing unsecured access. Similar to network security, the CSL may encrypt, at the virtual disk 510 level, all data stored by the migrated server. By encrypting at the CSL level, data is secure before it passes into the cloud provider environment and control. Similar security may be applied to any other hardware or communications device utilized by a migrated server with access simulated by the CSL. In addition to providing encryption solutions, network intrusion solutions may be implemented at the CSL level. Intrusion Detection System (IDS) 406 paths may be integrated at the CSL level to ensure network security. This same process may be used to introduce Intrusion Prevention Systems (IPS) into the cloud environment. Other technology may similarly be implemented to operate "below" a server that is deployed into a cloud. This means that encryption, IDS, IPS, and other technology may be implemented without modifying the operating system or applications of a server. In addition, these functions and capabilities cannot be altered by normal or privileged users of the server because they run below the server and are not run as configurations or processes within the operating system of the server. Similarly, the CSL may be configured to monitor aspects of a server such as CPU, memory, network, and disk 10 without accessing the operating system of the server. This provides protection from both user and cloud provider actions by providing monitoring independent of the cloud provider to monitoring users who still have no access to the server operating system.

The preferred embodiment provides an end-to-end solution for deploying servers securely in cloud environments. A trust root is established from the LMA, and security is built through each component in the system. Key exchanges and authentication may be managed by the system starting from the LMA and passing onto the LCG. The LCG builds the CSC, and finally the CSC establishes trust with the CSL. In this manner, the trust, keys 408, and security is built from the LMA to the CSL within the overall solution.

Server Control

By operating at a level below the application layer, the CSL may provide mirroring, replication, snapshot, monitoring, and other services for the migrated server. These services may utilize cloud specific functionality or implement completely independent operations, and therefore shift control and utilization fully to the cloud customer. Configuration and alteration of the operating environment for migrated servers is fully controllable by customers independent of cloud provider control. This control allows suspension and resumption of server operations, which in turn enables migration of servers from or within a cloud. Booting and rebooting migrated servers may be controlled by the CSL. This can be manually controlled by console access to a virtual VGA adapter and keyboard, or automatically upon detection of certain conditions. Uses include, but are not limited to, recovering from operating system failures; configuring network devices, drivers, addressing, or other configuration which requires a reboot; booting to last known good states; booting to alternate images. Such boot control via the CSL avoids cloud-reliance on proper network configuration of a migrated server to control booting options. In addition, multiple servers may be operated on top of the CSL. This allows operating multiple servers in a single cloud instance, and migrating active servers to independent cloud instances upon increased load or other factors. While the benefits of cloud services include management and dynamic provisioning of computing resources, this control allows additional user control of cloud resources, making a further layer of resource control available to cloud users.

Multi-Level Virtualization

The CSL is designed to provide the guest operating systems, when deployed into a cloud environment, with the hardware resources and physical mapping that the servers expect to see. These resources may be delivered in the exact format as the original servers so that the operating system and the applications deployed on the server do not have to be modified. Further, the CSL may deliver these resources independent of the virtualization platform used by the cloud provider. Thus, a server can move from one virtualized environment to another (such as from XEN to VMware, HyperV to XEN, VMware to HyperV, etc.). This is achieved by introducing a layer of virtualization that operates on top of the existing cloud infrastructure. This virtualization layer may operate on physical hardware, or on top of an existing virtualization layer or hypervisor.

Hypervisors provide a virtual platform to "guest" operating systems, while having access and control of the underlying physical hardware. Hardware systems generally provide various levels of control, allowing hypervisor implementation to add one level of virtualization without significant performance impact. Current hardware and hypervisor technology does not, however, generally anticipate two levels of virtualization. The original hypervisor designs for the x86 architectures take control of the "ring-0" protection ring of the processor. In a non-virtualized system, the operating system executes "kernel mode" operations in this ring because ring-0 has access to all registers and all of memory. The hypervisor must take control over this protection ring to keep virtualized guests from accessing the raw hardware since virtualized guests should operate only on virtualized hardware. Newer hardware supports the notion of "ring-root" or root mode which is specifically designed to allow a hypervisor to run at a privileged level "below" ring-0. In either case, on an x86 platform, the guest operating system runs on virtualized hardware with virtual ring-0, ring-1, and ring-3. In this fashion, a guest operating system "sees" a normal CPU and executes the operating system and applications as if everything is operating on normal hardware. The hypervisor, in conjunction with the hardware, handles situations where the guest operating system performs "privileged" instructions by intercepting the instructions, examining the operations, and fixing the accesses or emulating the results such that the guest operating system may operate as if on normal hardware. Since hypervisors are designed to have access to the real hardware, they generally are not designed to operate on top of virtual hardware. Even when configured to operate a hypervisor on top of virtual hardware, the performance of the stacked virtualization is expected to be very poor. This is due to multiple levels of faults per privileged instruction for the ultimate guest operating system. When a guest tries to execute a privileged instruction, a fault is generated to be handled by the lowest (or base) hypervisor. On a multi-virtualization layer system, the fault is delivered to the second level hypervisor to attempt to fix or emulate the faulting instruction. However, since this hypervisor is not running on the real hardware, this is likely to cause a fault into the base hypervisor which will fix or emulate the instruction that was the emulated instruction of the upper hypervisor. In this manner, all privileged operations in the guest operating system will cause multiple faults and transitions leading to significant performance penalties. This same process applies to the virtual address memory management system. Every time the guest operating system updates a page table, it will trigger processes in both levels of hypervisors to examine and correct (remap) virtual memory addresses. FIG. 8a illustrates the problem and delays with multiple faults generated by privileged instructions at the guest level. FIG. 8b illustrates a "look ahead" solution where the second level hypervisor reads ahead and processes a next privileged instruction, if one exists, to reduce the number of exchanges between the base CPU and multiple hypervisor levels. FIG. 9a also illustrates the problem and delays with multiple faults generated by privileged instructions at the guest level. FIG. 9b illustrates an alternative or additional improvement of having instructions and accesses directly call the second level hypervisor, removing an additional transition to the CPU through the first level hypervisor. FIG. 10a illustrates the problem and delays with faults generated to access register values. FIG. 10b illustrates a solution of having the second level hypervisor utilize memory instead of registers and reduce redundant writes to improve performance. FIG. 11a illustrates the problem and delays with accessing user space page tables. With normal hypervisor functionality, the second level hypervisor would protect from uncontrolled changes to the system memory page table control structures, resulting in performance overhead. FIG. 11b illustrates a solution of having guest access directly manipulate user space page tables.

The CSL provides an isolation layer which optimizes stacked or multi-level hypervisor performance by implementing some or all of the improvements shown in FIGS. 8b, 9b, 10b, and 11b. For example, the CSL may allow the guest operating systems to have direct access to the underlying platform. Specifically, all of the user space address mappings (page tables) may be given directly to the guest operating system. In this manner, the guest system may manipulate these memory pages without interference or overhead from the second level hypervisor. In another example, this isolation layer may patch instructions in the guest operating system such that they make calls to helper functions that eliminate the privileged operation, emulate the operation, or reduce the number of faults required to complete the operation. In this manner, the isolation layer boosts performance of the guest operating on top of the second level hypervisor by making most operations equivalent to those that execute on the first level hypervisor. Overall the construction of the CSL creates a very thin hypervisor that only focuses on providing the correct devices and virtual hardware to the guest operating system while creating a management space that is outside of the control of the guest operating system.

Other Embodiments

The Cloud Gateway may serve as a central point for accessing a variety of cloud services, such as, but not limited to, Infrastructure as a Service (IAAS), Platform as a Service (PAAS), and Software as a Service (SAAS). This provides a single point of control within an enterprise for accessing these various cloud services, allowing ties into the local infrastructure to facilitate secure data movement to and from the cloud services. User control and identity management may be remapped, creating a proxy for cloud services, and a local representation and access point for the external cloud services may be created and managed.

Additional benefits may result from implementing the full system, including advanced data services such as cloud agnostic storage services, data replication involving data center and multiple clouds, and enhanced storage services such as providing shared storage in environments without that specific construct. The CSL may map storage access calls to underlying storage technologies, either cloud-side or within the local data center, without requiring server or application awareness of the particular storage technology. Further, a unified interface may be provided to new cloud services such as S3 from Amazon. For example, the LMA may allow customers to access and use a distributed object store system without being locked into the Amazon system. The LMA may provide generic interfaces to the underlying cloud system as well as manage data movement to and from those services. This system allows the user to move between cloud services without having to change their applications or having to manage the complex data transfers between the services.

The system has additional benefits including disaster recovery and business continuity. The system may maintain up-to-date copies of a collection of servers within a cloud environment. These servers may be inactive to minimize expenses owed to the cloud provider. Upon detection of a failure of the primary data center or cloud, the system may automatically start the inactive servers in the cloud, thus creating a low cost business continuity system.

The LMA may provide an abstraction layer for the value added services provided by a specific cloud provider. As cloud providers differentiate their offerings with advanced services, the LMA may provide generic interfaces to these functions. These services may include, but are not limited to, backup services, data upload and download services, and operating system maintenance. The LMA may provide generic interfaces to these services so that they can be selected and integrated with data center processes without specific knowledge of the cloud provider's interfaces and mechanisms. Users may add requests or requirements to the LMA management system, and the specifics are managed and executed without the server or application modified to fit specific clouds. In cases where the target cloud does not support the functionality requested, the LMA may deploy the service within the new virtualized infrastructure, or as a third party software appliance deployed into the targeted cloud infrastructure.

Third party software and services may also be integrated in the CSL. As server data streams, such as network, storage, memory, and application instructions, pass through the CSL, they may be observed or interacted with at the CSL level. This interaction may be independent of both the underlying cloud platform or system, and the guest operating system operating on top the CSL. This creates an ideal and secure level to operate many different types of third party solutions. For example, remote replication, various forms of encryption, data de-duplication, compression, and virus scanning could be run at the CSL level. Monitoring instruction streams for changes could be part of virus detection or verification systems for monitoring executing software, access interrupt information could be part of performance monitoring, scanning memory may be part of both virus detection and pattern matching, and hooking or intercepting system calls may be done without modifying the operating system. Thus the CSL may server as a platform to introduce third party solutions into cloud systems without requiring integration at the cloud platform level or at the server software or application level.

In various embodiments, multiple components may be implemented jointly on shared systems. For example, the LMA and LCG may be combined into a single machine in the data center, which may be the preferred method for small installations or simplified deployment. Similarly, the cloud side functions carried out within the CSC and CSL are services that may be executed on any "node" on the cloud side. The data movement and "staging" may be carried out through the CSC. For cloud providers that do not have detachable storage, the staging may be carried out on the CSL.

Various system-wide or component specific features may be enabled or disabled. For example, the use of encryption at any point of the system may be enabled or disabled depending on the desired security versus performance tradeoff.

The specific network technology used to create the connection between the data center and the cloud may also vary. The use of Secure Socket Layer (SSL) technology combined with OpenVPN may be replaced with IPSEC and other VPN technology. The preferred embodiment uses an overlay network that allows for the Layer-2 transport of networking traffic between the data center and cloud. Alternatively, this could be done on a different level, such as at IP (layer-3 or higher), as well.

Alternative embodiments may utilize various solutions to improve performance of specific functions. For example, the system can be optimized by using standard components that are already available in the cloud. Specific base servers and operating systems can be generically staged to a specific cloud. When a user wants to move a server to the cloud, the generic server can be used as a baseline to help reduce the amount of data that needs to be transferred to the cloud (thus improving speed of deployment and reducing bandwidth costs). This is the equivalent of de-duplication of the data that represents the servers moving into the cloud.

The system is designed for connecting computer-room data centers to the cloud; however, it can be applied to small businesses without such data centers as well. The LMA installed in a small business allows for the seamless utilization of cloud resources. The local network, printers, desktops, services may be accessed, used, and joined with cloud resources without the users having to resolve complex networking, naming, or resource issues. In effect, this gives the small business access to unlimited resources.

The Cloud Isolation Layer (CSL) may be implemented with various technologies including shared kernels, containers, or other isolation techniques. The overall design of the system is to create an additional context within the cloud deployment such that isolation and functions can be implemented in this extra context. Each of these isolation technologies has specific benefits, for example, the multi-level virtualization described above can preserve all aspects of the user's environments, but has a specific performance capability. A container based isolation layer (using a shared kernel) can deliver a near replica of the environment but at higher performance.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
   one or more devices to:
      scan existing computing topology, within a data center local to the one or more devices, to determine configuration information relating to one or more servers within the data center, and
      control migration of functions performed by the one or more servers, within the data center, to a remote cloud platform, based on the configuration information; and
   a gateway device to map, based on the configuration information, network access, relating to the functions and directed to the data center, to the remote cloud platform.

2. The system of claim 1, wherein the configuration information includes names of the one or more local servers and capabilities of the one or more local servers.

3. The system of claim 1, wherein the one or more devices are to scan the existing computing topology to determine additional configuration information relating to one or more storage devices or network equipment associated with the one or more servers.

4. A method, implemented by one or more devices, comprising:
   scanning, by the one or more devices, a data center to automatically determine configuration information relating to one or more servers within the data center;
   migrating, based on the configuration information and by the one or more devices, functions performed by the one or more servers and resources required by the functions, to a remote cloud platform; and
   mapping, by the one or more devices and based on the configuration information, network access, associated with the data center, to the functions and resources migrated to the remote cloud platform.

5. The method of claim 4, wherein scanning the data center further includes:
   inspecting specific devices within the data center, to determine device names and capacities.

6. The method of claim 5, wherein scanning the data center further includes:
   determining configuration information of one or more storage devices or networking equipment associated with the data center.

7. The method of claim 4, further comprising
   redirecting the network access, from the one or more servers, to one or more migrated servers at the remote cloud platform, based on the mapping, without reconfiguring other devices or naming schemes within the data center.

8. The method of claim 4, further comprising:
   migrating the functions performed by the one or more servers from the remote cloud platform to a second cloud platform; and
   redirecting the network access to the second cloud platform without reconfiguring the one or more servers or other devices or naming schemes within the data center.

9. The method of claim 8, further comprising:
   triggering the migrating, from the remote cloud platform to the second cloud platform, based on resource usage levels and pricing relating to the remote cloud platform.

10. The method of claim 8, further comprising:
    triggering the migrating, from the remote cloud platform to the second cloud platform, based on detection of network or infrastructure failure.

11. The method of claim 4, further comprising
    responding to communications from hardware monitoring and control schemes, in the remote cloud platform, directed towards the one or more servers within the cloud platform.

12. The method of claim 11, wherein the hardware monitoring and control schemes include at least one of integrated lights out management, an intelligent platform management interface, and a simple network platform management protocol daemon.

13. A system comprising:
    a cloud platform including:
       a cloud software control component to manage resources within the cloud platform, and
       a cloud isolation layer to provide a virtualization platform for operating one or more servers within the cloud platform; and a data center including:
one or more computing devices to automatically scan an existing computing topology, of the data center, to determine configuration information of one or more servers within the data center, and
one or more computing devices to implement, based on the configuration information, migration of functions performed by the one or more servers, within the data center, to the one or more servers within the cloud platform.

14. The system of claim 13, wherein the cloud isolation layer provides the virtualization platform without modification to addressing schemes configured for network access within the data center.

15. The system of claim 13, wherein the cloud isolation layer is further to:
remap communications between the cloud platform and the one or more servers within the cloud platform such that network and device access calls by the one or more servers, within the cloud platform, referencing naming schemes valid within the data center, are mapped to resources within the cloud platform.

16. The system of claim 15, wherein the remapping further includes mapping storage access calls from the one or more servers, within the cloud platform, to storage technology available within the cloud platform without requiring the one or more servers, within the cloud platform, to specify a specific storage technology.

17. The system of claim 13, wherein the cloud isolation layer operates as a virtual layer on top of a hypervisor or physical hardware exposed by the cloud platform.

18. The system of claim 17, wherein the hypervisor includes a plurality of stacked hypervisors in which performance is optimized for the plurality of stacked hypervisors.

* * * * *